United States Patent [19]

Esterowitz et al.

[11] Patent Number: 5,289,482
[45] Date of Patent: Feb. 22, 1994

[54] INTRACAVITY-PUMPED 2.1 μM HO³⁺:YAG LASER

[75] Inventors: Leon Esterowitz, Springfield; Robert S. Stoneman, Alexandria, both of Va.

[73] Assignee: The United States of America as represented by the Secretary of the Navy, Washington, D.C.

[21] Appl. No.: 998,348

[22] Filed: Dec. 30, 1992

[51] Int. Cl.⁵ ............................................... H01S 3/16
[52] U.S. Cl. .......................................... 372/41; 372/68
[58] Field of Search ........................... 372/41, 71, 68

[56] References Cited

U.S. PATENT DOCUMENTS

| | | | |
|---|---|---|---|
| 4,321,559 | 3/1982 | Esterowitz | 372/41 |
| 4,879,723 | 11/1989 | Dixon et al. | |
| 4,884,277 | 11/1989 | Anthon et al. | |
| 4,901,330 | 2/1990 | Wolfram et al. | |
| 4,933,947 | 6/1990 | Anthon et al. | |
| 4,942,582 | 7/1990 | Kintz et al. | 372/41 |
| 4,956,843 | 9/1990 | Akhavan-Leilabady et al. | |
| 4,965,803 | 10/1990 | Esterowitz et al. | |
| 4,974,230 | 11/1990 | Hemmati | |
| 5,038,353 | 8/1991 | Esterowitz et al. | 372/41 |
| 5,063,566 | 11/1991 | Dixon | 372/41 |
| 5,070,507 | 12/1991 | Anthon | 372/41 |
| 5,088,103 | 2/1992 | Esterowitz et al. | |
| 5,115,445 | 5/1992 | Mooradian | 372/41 |
| 5,164,953 | 11/1992 | Case et al. | 372/41 |

OTHER PUBLICATIONS

Anthon et al., "Erbium and Holmium Lasers Pumped with Nd:YAG", Conference Proceedings, IEEE Lasers and Electro-Optics Society 1990 Annual Meeting (IEEE, New York, 1990), pp. 519–520.

Primary Examiner—Rodney B. Bovernick
Assistant Examiner—Robert E. Wise
Attorney, Agent, or Firm—Thomas E. McDonnell; George Jameson

[57] ABSTRACT

In a preferred embodiment, a Tm³⁺:YAG laser crystal and a Ho³⁺:YAG laser crystal are placed within a reflective path of a laser cavity for intracavity pumping the Ho³⁺:YAG laser crystal. The Tm³⁺:YAG laser crystal emits a substantially 2.0 μm laser emission after being resonantly end-pumped by a pump beam at a wavelength of about 785 nm and the substantially 2.0 μm laser emission is used to pump the Ho³⁺:YAG laser crystal. The intracavity-pumped Ho³⁺:YAG laser crystal emits an output laser emission at substantially 2.1 μm. The slope efficiency of the Ho³⁺:YAG laser crystal output power is about 40% of the pump power absorbed by the Tm³⁺:YAG laser crystal.

17 Claims, 2 Drawing Sheets

INTRACAVITY-PUMPED 2.1 μM HO$^{3+}$:YAG LASER

CROSS-REFERENCE TO RELATED APPLICATION

This application is related to co-pending, commonly assigned U.S. patent application Ser. No. 07/998,347, filed concurrently with the present application on Dec. 30, 1992 by Steven R. Bowman and Barry J. Feldman and entitled "HOLMIUM QUASI-TWO LEVEL LASER".

BACKGROUND OF THE INVENTION

Field of the Invention

The present invention relates to a laser and in particular to an intracavity-pumped laser.

Discussion of the Related Art

U.S. Pat. No. 5,038,353 to Esterowitz et al. discloses in FIG. 1 a 2.1 μm laser system comprising: a laser diode 2 to provide pumping for the laser system; a lens 4 to collect the output of the laser diode 2; a cylindrical lens 6 to vertically compress the optical throughput from the lens 4; and an objective lens 8 to more narrowly focus the output of the laser diode 2 onto a laser target 10. The laser target 10 has an active laser medium between reflective surfaces. The active laser medium is in the form of a yttrium-aluminum garnet (YAG) crystal structure which is co-doped with Tm$^{3+}$ and Ho$^{3+}$ ions. The concentration of Ho$^{3+}$ ions within the crystal lattice of the YAG crystal is between 0.1% to 0.4%, and preferably, 0.36% within the crystal lattice of the YAG crystal. The concentration of Tm$^{3+}$ ions is between 4% to 7%, and preferably, 5.7% within the crystal lattice of the YAG crystal.

FIG. 2 illustrates transitions of the Tm$^{3+}$ and Ho$^{3+}$ ions between the energy levels as the co-doped YAG crystal 10 is pumped by the laser diode 2. The continuous wave pump beam from the pump laser at 785 nm excites a Tm$^{3+}$ ion from a $^3H_6$ ground electronic state to a $^3H_4$ electronic state. The $^3F_4$ electronic state of the Tm$^{3+}$ ions is populated by a cross-relaxation process (indicated by a dashed arrow). The cross-relaxation process, also known as a self-quenching process, is a near-resonant nonradiative process in which an excited Tm$^{3+}$ ion in the $^3H_4$ electronic state decays to the $^3F_4$ electronic state and a neighboring Tm$^{3+}$ ion at the $^3H_6$ electronic state is promoted to the $^3F_4$ electronic state. The cross-relaxation process is advantageous because a single Tm$^{3+}$ ion excited to the $^3H_4$ level generates two Tm$^{3+}$ ions in the $^3F_4$ level. It has been shown that the probability of the Tm$^{3+}$ cross-relaxation occurring is negligible for concentrations of Tm$^{3+}$ ions less than about 2%, but approaches unity for concentrations of Tm$^{3+}$ ions greater than about 4%.

Each of the $^3F_4$ electronic states of the respective Tm$^{3+}$ ions are closely coupled to the $^5I_7$ electronic state of the Ho$^{3+}$ ions. The dipole-dipole interaction between nearby Tm$^{3+}$ and Ho$^{3+}$ ions in the YAG crystal allows the transfer of the Tm$^{3+}$ $^3F_4$ excitation to the Ho$^{3+}$ $^5I_7$ electronic state (indicated by the curved arrow in FIG. 2. When the Ho$^{3+}$ ions decay from the $^5I_7$ electronic state to the $^5I_8$ electronic state, photons are generated to create the lasing in the system, and the photons correspond to a wavelength of substantially 2.1 μm. A high Tm$^{3+}$ ion concentration is used in order to efficiently absorb the pump radiation and to facilitate the efficient population of the Tm$^{3+}$ $^3F_4$ electronic state. The Ho$^{3+}$ concentration is kept low in order to minimize the reabsorption losses.

In the above co-doped Tm$^{3+}$, Ho$^{3+}$:YAG laser crystal system, the effective lifetime of the $^5I_7$ electronic state is reduced significantly below its intrinsic lifetime owing to the upconversion process, i.e., Tm$^{3+}$ $^3F_4 \rightarrow ^3H_6$, Ho$^{3+}$ $^5I_7 \rightarrow ^5I_5$. As shown in FIG. 3, a Ho$^{3+}$ ion in the $^5I_7$ electronic state interacts with a Tm$^{3+}$ ion in the $^3F_4$ electronic state. When the Tm$^{3+}$ ion decays to the $^3H_6$ ground electronic state, the Ho$^{3+}$ ion is excited to the $^5I_5$ electronic state. The Ho$^{3+}$ ion at the $^5I_5$ electronic state decays back to the $^5I_7$ electronic state by the emission of phonons, with a quantum efficiency of near unity. Because of the loss of excitation of the Ho$^{3+}$ ions out of the $^5I_7$ electronic state, the upconversion process is a loss mechanism which raises the threshold of the laser and decreases the effective storage lifetime of the Ho$^{3+}$ ions in the $^5I_7$ electronic state.

Other systems are described in the following patents:

U.S. Pat. No. 5,088,103 to Esterowitz et al. discloses a flashlamp-pumped, room temperature solid state laser for producing a 2.09 μm laser emission with a preferred slope efficiency of at least 5% comprising: a laser cavity defined by first and second reflective elements opposing each other on a common axis to form a path therebetween; a laser crystal disposed in the laser cavity; and a flashlamp for exciting the laser crystal to produce a laser emission. The laser crystal has a host material which is capable of accepting Cr$^{3+}$ sensitizer ions, Tm$^{3+}$ sensitizer ions and Ho$^{3+}$ activator ions. The concentration of Cr$^{3+}$ and Tm$^{3t}$ sensitizer ions is about 0.3%-2% and 3%-12%, respectively, and the concentration of the Ho$^{3+}$ activator ions is about 0.1%-0.7% within the host material.

U.S. Pat. No. 4,974,230 to Hemmati discloses a Ho:YLF crystal having thulium (Tm) as a sensitizer for the activator holmium (Ho). The Ho:YLF crystal is optically pumped with a semiconductor diode laser array to generate a 2.1 μm radiation. By using Tm alone, decreasing the concentrations of Tm and Ho ions and decreasing the length of the laser rod to about 1 cm, a laser operation can be obtained with an efficiency as high as 68% at a temperature of 77° K, and with an efficiency as high as 9% at ambient room temperature.

U.S. Pat. No. 4,956,843 to Akhavan-Leilabady et al. discloses a laser system for the simultaneous generation of laser radiation at two different frequencies. An output of a single semiconductor light source is used to optically pump two solid state lasers which are arranged in series and the two solid state lasers produce laser radiation at two different frequencies.

U.S. Pat. Nos. 4,933,947 and 4,884,277, both to Anthon et al., disclose an intracavity frequency-modified laser of improved amplitude stability obtained through the use of a plurality of non-linear optical crystals within a laser cavity. A non-linear optical crystal is placed within the laser cavity with another laser material, as shown in U.S. Pat. No. 4,933,947, or with other non-linear optical crystals, as shown in U.S. Pat. No. 4,884,277.

U.S. Pat. No. 4,901,330 to Wolfram et al. discloses a laser system comprising: a laser diode array; a lens; a lasant material; a reflective coating surface; an output surface; a non-linear optical material; and an optical coupler. The lasant material may be chosen from one of the following materials: Nd:YVO$_4$; Nd, Cr:GSGG; Tm, Ho, Er:YAG; or Ti:Al$_2$O$_3$.

U.S. Pat. No. 4,879,723 to Dixon et al. discloses an efficient, compact source of coherent radiation in the infrared, visible and ultraviolet portion of the light spectrum which is capable of modulation rates over a range from 0 Hz to in excess of 1 GHz. The optical cavity contains a non-linear optical crystal. When an input radiation is introduced into the optical cavity, the radiation is produced by optical mixing within the optical cavity of the laser In the publication "Erbium And Holmium Lasers Pumped With Nd:YAG", by Anthon et al., Conference Proceedings, IEEE Lasers and Electro-Optics Society 1990 Annual Meeting (IEEE, New York, 1990), pp. 519–520, a 1.54-$\mu$m Er:Glass laser was pumped with a diode-pumped 1.064-$\mu$m Nd:YAG laser. The laser cavity of the Nd:YAG laser partially overlapped the laser cavity of the Er:G-lass laser at the Erbium:Glass crystal. The use of the closely matched pump and laser modes resulted in a more efficient utilization of the Nd:YAG laser compared to the early flash lamp-pumped intracavity lasers which were not mode-matched.

SUMMARY OF THE INVENTION

It is an object of the present invention to provide a method of eliminating non-linear upconversion.

Another object of the present invention is to provide a method for increasing the effective lifetime of the upper laser level.

Another object of the present invention is to provide a method of intracavity pumping a laser crystal.

Another object of the present invention is to provide a method for efficient intracavity absorption of a pump beam.

Another object of the present invention is to provide laser having a threshold which is substantially independent of reabsorption losses.

Another object of the present invention is to provide an intracavity-pumped laser having reabsorption losses which are 20–30 times smaller than a laser using single-pass absorption.

A further object of the present invention is to provide a laser having a slope efficiency equal to about 42% of the absorbed pumped power.

To achieve the foregoing and other objects and advantages of the invention, two separate linear laser crystals are placed within a laser cavity. A pump laser resonantly end-pumps a first one of the laser crystals to produce a first laser emission.

It should be noted at this time that a pump laser develops a pump beam. Hereinafter, the term "pump beam" should be understood to mean "a continuous wave (CW) or quasi-CW pump beam". Also, the term "quasi-CW" should be understood to mean "a pump beam having a pulse duration greater than 100 microseconds".

The first laser emission from the first laser crystal end-pumps the second laser crystal to produce a second laser emission with a predetermined wavelength. In the preferred embodiment, the first laser crystal is doped with a preselected concentration of Tm$^{3+}$ ions and the second laser crystal is doped with a preselected concentration of Ho$^{3+}$ ions. The pump laser outputs a continuous wave pump beam having a wavelength substantially equal to 785 nm, and the first and second laser emissions have wavelengths substantially equal to 2.0 $\mu$m and 2.1 $\mu$m, respectively.

Further, a method of producing a laser emission comprises the steps of resonantly end-pumping a first laser crystal having a first-type of ions with a pump laser to raise the first-type of ions from a first electronic state to a second electronic state, the first laser crystal emitting a first laser emission as the first-type of ions decays from the second electronic state to the first electronic state; and pumping a second laser crystal having a second-type of ions with the first light emission to raise the second-type of ions from a third electronic state to a fourth electronic state, the second laser crystal emitting the laser emission as the second-type of ions decays from the fourth electronic state to the third electronic state. Further, the step of raising the first-type of ions from the first electronic state to the second electronic state includes a self-quenching process.

The present invention is applicable to any lasers using intracavity pumping technique. Further, the laser cavity can contain a plurality of laser crystals.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

The reduction in effective storage lifetime of the Ho$^{3+}$ ions in the $^5$I$_7$ electronic state can be avoided by directly pumping a crystal doped only with Ho$^{3+}$ ions. This direct pumping method of the Ho$^{3+}$ laser crystal suffers, however, from (1) a weak absorption cross-section of the Ho$^{3+}$ ions and (2) a relatively high ratio of the fraction of lower electronic state population residing in the particular crystal-field component serving as the lower level compared to the upper electronic state and the upper level. As a result, a Ho$^{3+}$ laser crystal pumped by a 2.0 $\mu$m pump beam has large reabsorption losses and relatively high threshold.

For example, compared to a Tm$^{3+}$:YAG laser crystal pumped at 785 nm, a Ho$^{3+}$:YAG laser crystal pumped at 2.0 $\mu$m has a threshold which is approximately 20 times larger than the Tm$^{3+}$:YAG laser. Typically, under single-pass pump absorption conditions, a Tm$^{3+}$:YAG laser has a threshold of 50–100 mW when directly pumped by 785 nm pump beam with a spot size less than 100 $\mu$m. Thus, a Ho$^{3+}$:YAG laser is expected to have a threshold of $\approx$1-2W when directly pumped by a 2.0 μm pump beam with a spot size less than 100 μm and under single-pass pump absorption conditions.

Figure 4A:
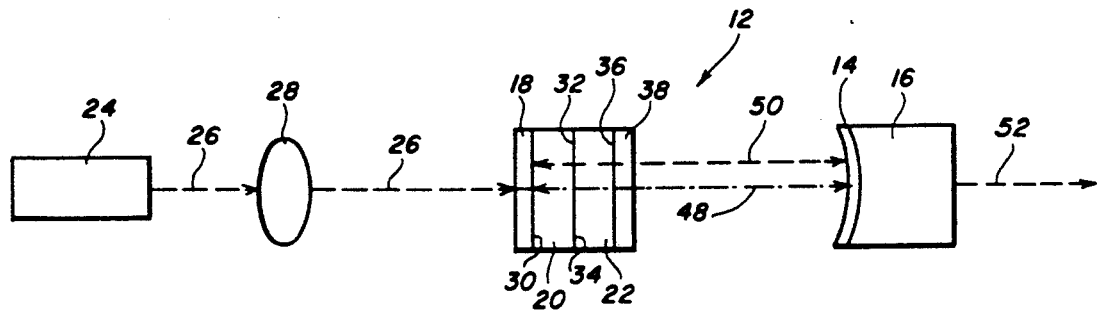
FIG. 4A illustrates the intracavity-pumped Ho$^{3+}$ laser of the present invention.

FIG. 4A illustrates the intracavity-pumped laser in accordance with the present invention. In the preferred embodiment of FIG. 4A, the intracavity-pumped $Ho^{3+}$ laser comprises a laser cavity 12 defined by a reflective surface 14 of an output coupler 16 and a dichroic coating 18 on a first laser crystal 20 opposing each other on a common axis to form a reflective path therebetween, the first laser crystal 20 being disposed in the laser cavity, a second laser crystal 22 disposed in the laser cavity, a pump laser 24 for developing a pump beam 26 to resonantly end-pump the first laser crystal 20 and focusing means 28 for focusing the pump beam 26. As stated before, the term "pump beam" should be understood to mean "a continuous wave (CW) or quasi-CW pump beam", and the term "quasi-CW" should be understood to mean "a pump beam having a pulse duration greater than 100 microseconds".

The pump laser 24 can be any conventional source of optical pump beam, such as a diode laser or a Ti:Sapphire laser. For efficient operation, the pump beam 26 is matched with a suitable absorption band of the first laser crystal 20 in the laser cavity 12. In the preferred embodiment, the pump laser 24 is a diode laser outputting a continuous wave pump beam 26 at 785 nm.

The focusing means 28 serves to focus the pump beam 26 into the first laser crystal 20. The focusing of the pump beam 26 results in a high pumping intensity and an associated high photon to photon conversion efficiency in the first laser crystal 20. The focusing means 28 an comprise any conventional means for focusing light such as a gradient index lens, a ball lens, and aspheric lens or a combination of lenses.

Each of the laser crystals 20 and 22 has a laser host crystal material (not shown) which is selected from the broad group consisting of YAG (yttrium aluminum garnet), YSAG (yttrium scandium aluminum garnet), YSGG (yttrium scandium gallium garnet), YGG (yttrium gallium garnet), GGG (gadolinium gallium garnet), GSAG (gadolinium scandium aluminum garnet), GSGG (gadolinium scandium gallium garnet), LLGG (lanthanum lutetium gallium garnet), YAP (yttrium aluminum perovskite) and YLF (yttrium lithium fluoride). The host crystal material could also be comprised of mixtures or combinations of this broad group of crystal materials. The preferred group of host crystal materials for each of the laser crystals 20 and 22 is comprised of YAG, YSAG, YSGG, GSAG, GSGG and mixtures thereof; and the most preferred group of host crystal materials for each of the laser crystals 20 and 22 is comprised of YAG, YSGG and mixtures thereof.

The selected host crystal material of the laser crystal 20 is doped with an effective amount of $Tm^{3+}$ (thulium) activator ions. When the laser crystal 20 is pumped by the pump beam from the pump laser 24, the laser crystal 20 develops a laser emission at substantially 2.01 microns. On the other hand, the selected host crystal material of the laser crystal 22 is doped with an effective amount of $Ho^{3+}$ (holmium) activator ions. When the laser crystal 22 is pumped by the laser emission (or pump beam) from the laser crystal 20, the laser crystal 22 develops laser emissioin at substantially 2.1 microns.

The chief characteristic or requirement of the selected host crystal material for the laser crystal 20 is that it must have the capability of easily accepting the dopant trivalent thulium ions ($Tm^{3+}$). The dopant $Tm^{3+}$ ions must go into the host crystal material of the laser crystal 20 without significantly distorting the lattice of the host crystal material so that the quality of the host crystal material remains high. Similarly, the chief characteristic or requirement of the selected host crystal material for the laser crystal 22 is that it must have the capability of easily accepting the dopant trivalent holmium ions ($Ho^{3+}$). The dopant $Tm^{3+}$ ions must go into the host crystal material of the laser crystal 22 without significantly distorting the lattice of the host crystal material so that the quality of the host crystal material remains high.

The $Tm^{3+}$ ions are the activator ions which cause the lasing from the laser crystal 20. The $Tm^{3+}$ concentration or amount must be high enough so that an efficient cross-relaxation process, which populates the upper laser level, takes place. The term "cross-relaxation process" is well known by those skilled in the art and, hence, requires no further description. The term "effective amount of $Tm^{3+}$ ions" means that the amount of $Tm^{3+}$ ions in the host crystal material of the laser crystal 20 is sufficient to enable a cross-relaxation process to be achieved with close to 100% effectiveness. Similarly, the $Ho^{3+}$ ions are the activator ions which cause the lasing from the laser crystal 22. The $Ho^{3+}$ concentration or amount must be high enough so that an efficient cross-relaxation process, which populates the upper laser level, takes place. The term "effective amount of $Ho^{3+}$ ions" means that the amount of $Ho^{3+}$ ions in the host crystal material in the crystal laser 22 is sufficient to enable a cross-relaxation process to be achieved with close to 100% effectiveness.

The host crystal material of the laser crystal 20 can be doped with an amount of $Tm^{3+}$ ions within a broad range between about 2.5% and about 20%, can be doped with an amount of $Tm^{3+}$ ions within an intermediate range between about 4% and about 12%, or can be doped with an amount of $Tm^{3+}$ ions within a preferred range between about 6% and about 8%.

The host crystal material of the laser crystal 22 can be doped with an amount of $Ho^{3+}$ ions within a broad range between about 0.05% and about 2%, can be doped with an amount of $Ho^{3+}$ ions within an intermediate range between about 0.1% and about 1%, or can be doped with an amount of $Ho^{3+}$ ions within a preferred range between about 0.3% and about 0.5%.

It should be noted at this time that, by the use of the percentage (%) ranges used in conjunction with the term "amount of $Tm^{3+}$ ions" (or the term "amount of $Ho^{3+}$ ions"), it is meant the percent of substitution of the $Tm^{3+}$ ions (or of the $Ho^{3+}$ ions) for the yttrium ions in YAG, for the yttrium ions in YSAG, for the yttrium ions in YSGG, for the yttrium ions in YGG, for the gadolinium ions in GGG, for the gadolinium ions in GSAG, for the lanthanum ions in LLGG, for the yttrium ions in YAP, for the yttrium ions in YLF. For example, an amount of $Tm^{3+}$ ions of 12% in a YAG host crystal material in the laser crystal 20 means that the $Tm^{3+}$ ions are substituted for (or replace) 12% of the yttrium ions in the YAG host material of the laser crystal 20, and an amount of $Ho^{3+}$ ions of 0.5% in a YAG host crystal material in the laser crystal 22 means that the $Ho^{3+}$ ions are substituted for (or replace) 0.5% of the yttrium ions in the YAG host crystal material of the laser crystal 22.

It should also be noted that the selected host crystal materials in the laser crystals 20 and 22 are respectively doped with the effective amount of $Tm^{3+}$ ions and with the effective amount of $Ho^{3+}$ ions by applying techniques well known to those skilled in the art and, hence, requires no further description of such techniques.

In the laboratory test of the invention, the first laser crystal 20 comprised a yttrium aluminum garnet (YAG) crystal doped with 12% concentration of $Tm^{3+}$ ions (12% $Tm^{3+}$:YAG laser crystal) and the second laser crystal 22 was a YAG crystal doped with 0.5% concentration of $Ho^{3+}$ ions (0.5% $Ho^{3+}$:YAG laser crystal). Both the 12% $Tm^{3+}$:YAG laser crystal 20 and 0.5% $Ho^{3+}$:YAG laser crystal 22 were rod shaped and each crystal had an exemplary length equal to about 2.5 mm. However, it can be appreciated that other suitable shapes and dimensions can be used and that the lengths of the two laser crystals need not be the same.

As shown in FIG. 4A, both the 12% $Tm^{3+}$:YAG and 0.5% $Ho^{3+}$−:YAG laser crystals 20, 22 have first 30, 34 and second 32, 36 surfaces which are flat and parallel. The second surface 32 of the 12% $Tm^{3+}$: YAG laser crystal 20 is optically coupled to the first surface 34 of the 0.5% $Ho^{3+}$:YAG laser crystal 22. The first dichroic coating 18, which is one of the reflective surfaces of the laser cavity 12, is formed on the first surface 30 of the 12% $Tm^{3+}$:YAG laser crystal 20. The first dichroic coating 18 is highly transmissive at a wavelength of 785 nm and is highly reflective at wavelengths between 2.0 $\mu m$ and 2.1 $\mu m$. A second dichroic coating 38 is formed on the second surface 36 of the 0.5% $Ho^{3+}$:YAG laser crystal 22. The second dichroic 38 is anti-reflective to light having wavelengths between 2.0 to 2.1 $\mu m$.

The output coupler 16 has a concave face with a 10 cm radius of curvature. The reflective surface 14 of the output coupler 16 is highly reflective at a wavelength of 2.0 $\mu m$ and has a 98.5 reflectivity (i.e., 1.5% transmission) at a wavelength of 2.1 $\mu m$. The output coupler 16 can also be selected from a variety of different output couplers with a radius of curvature ranging from 5 cm to 20 cm and an output coupling ranging from a transmission of 0.5% to a transmission of 5%. It can be appreciated, however, that other suitable radius of curvature and transmission can be used.

Figure 4B:
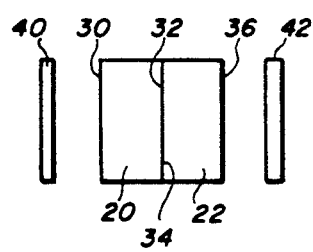
FIGS. 4B and 4C illllustrate different embodiments of the laser cavity in the intracavity-pumped laser of the present invention.
Figure 4C:
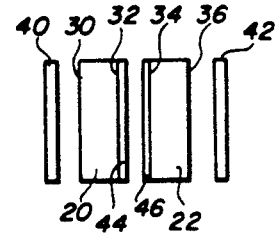

FIG. 4B and 4C illustrate different arrangements of the reflective surfaces for the laser crystals. The first and second dichroics 18, 38 can be replaced by first and second mirrors 40, 42 spaced apart from the laser crystals 20, 22. The first and second mirrors 40, 42 have the same light reflection and transmission properties as the first and second dichroics 18, 38. Alteratively, as shown in FIG. 4C, the laser crystals 20, 22 need not be optically coupled to each other. Instead, the second surface 32 of the 12% $Tm^{3+}$:YAG laser crystal 20 can be coated with a dielectric coating 44 which is anti-reflective between wavelengths of 2.0 $\mu m$ to 2.1 $\mu m$, and the first surface 34 of the 0.5% $Ho^{3+}$:YAG laser crystal 22 can also be coated with a dielectric coating 46 which is anti-reflective between wavelengths of 2.0 $\mu m$ and 2.1 $\mu m$.

Figure 5:
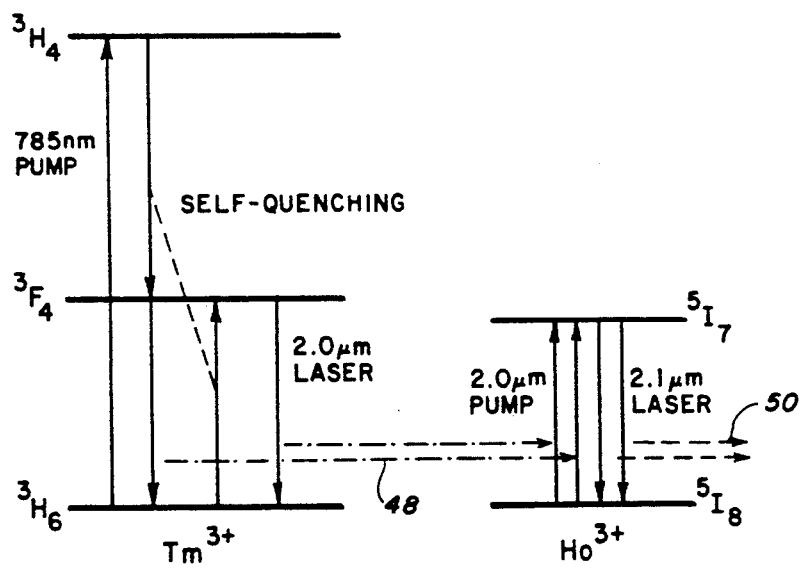
FIG. 5 illustrates the energy band diagram of the intracavity-pumped laser according to the present invention.

FIG. 5 illustrates the various transitions of the $Tm^{3+}$ and $Ho^{3+}$ ions within the energy levels of the laser crystals when the 12% $Tm^{3+}$:YAG laser crystal 20 is pumped by a 785 nm pump beam 26 of the pump laser 24. The 785 nm pump beam 26 excites the $Tm^{3+}$ ions from the $^3H_6$ electronic state to the $^3H_4$ electronic state. The $^3F_4$ electronic state is populated by the self-quenching process between the excited $Tm^{3+}$ ions at the $^3H_4$ electronic state and the $Tm^{3+}$ ions at the $^3H_6$ electronic state.

When the $Tm^{3+}$ ions populating the $^3F_4$ electronic state decay to the $^3H_6$ electronic state, the 12% $Tm^{3+}$:YAG laser crystal 20 emits a 2.0 $\mu m$ wavelength laser emission 48. The 2.0 $\mu m$ wave-length laser emission 48 is used to pump the 0.5% $Ho^{3+}$:YAG laser crystal 22, and the $Ho^{3+}$ ions at the $^5I_8$ electronic state are excited to the $^5I_7$ electronic state. As the excited $Ho^{3+}$ ions at the $^5I_7$ electronic state decay to the $^5I_8$ electronic state, the 0.5% $Ho^{3+}$:YAG laser crystal 22 emits a 2.1 $\mu m$ wavelength light emission 50.

As the 12% $Tm^{3+}$:YAG laser crystal emits the 2.0 $\mu m$ wavelength laser emission 48, only 2% of the 2.0 $\mu m$ wavelength laser emission 48 is absorbed per round trip transit by the $Ho^{3+}$:YAG laser crystal 22. The unabsorbed 2.0 $\mu m$ wavelength laser emission 48 is confined within the laser cavity 12 by the reflective surfaces of the output coupler 16 and the first dichroic 18 or mirror 40. Further, the 2.1 $\mu m$ wavelength laser emission 50 cannot escape the laser cavity 12 until the 2.1 $\mu m$ laser emission 50 reaches a predetermined magnitude.

The confined 2.0 $\mu m$ and 2.1 $\mu m$ wavelength laser emissions 48, 50 become a standing wave operating at $TEM_{00}$ or Gaussian mode. Because the modes of 2.0 $\mu m$ and 2.1 $\mu m$ wavelength laser emissions 48, 50 are nearly identical and overlap one another, reabsorptions losses of the intracavity-pumped $Ho^{3+}$ laser crystal are $\approx 20-30$ times smaller than a $Ho^{3+}$ laser crystal under single-pass absorption conditions. As the 2.0 $\mu m$ wavelength laser emission 48 bounces back and forth between the reflective surfaces 14 and 18, 2% of the 2.0 $\mu m$ wavelength laser emission 48 of the 12% $Tm^{3+}$:YAG laser crystal 20 is absorbed by the $Ho^{3+}$ ions per round trip and the magnitude of the 2.1 $\mu m$ wavelength laser emission 50 of the 0.5% $Ho^{3+}$:YAG laser crystal 22 steadily increases. When the confined 2.1 $\mu m$ wavelength laser emission 50 reaches a steady state magnitude, leakage through the reflective surface 14 of the output coupler 16 constitutes the 2.1 $\mu m$ wavelength steady state output 52 of the intracavity-pumped $Ho^{3+}$ laser.

Figure 1:
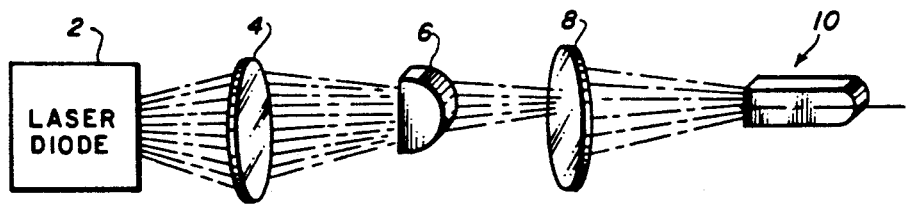
FIG. 1 illustrates a prior art 2.1 $\mu$m laser system having an active laser medium co-doped with Tm$^{3+}$ and Ho$^{3+}$ ions.
Figure 2:
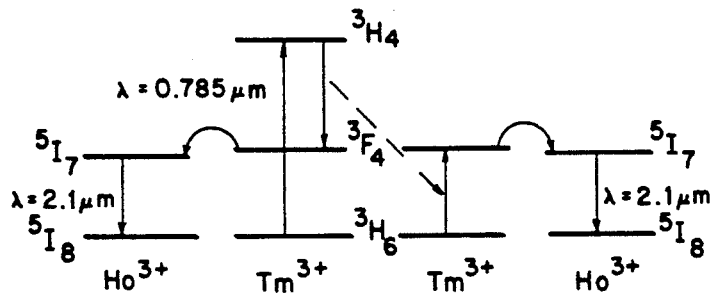
FIG. 2 illustrates the energy-level diagram for the laser system shown in FIG. 1.
Figure 3:
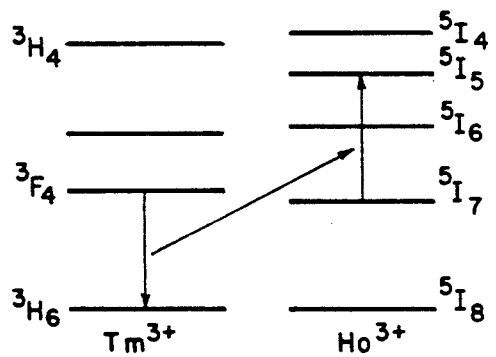
FIG. 3 is an energy-level diagram illustrating the non-linear upconversion process.
Figure 6:
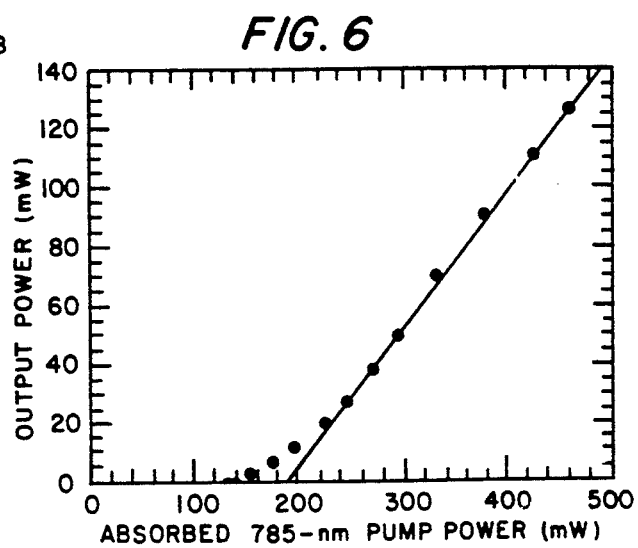
FIG. 6 is a plot of the intracavity-pumped laser output power versus the absorbed 785 nm pump power.

FIG. 6 illustrates a plot of the 2.0 $\mu m$ and 2.1 $\mu m$ wavelength laser emissions output power versus the absorbed 785 nm pump power. Of the total output power, 90% is at 2.1 $\mu m$ wavelength due to the $Ho^{3+}$ $^5I_7 \rightarrow ^5I_8$ electronic state transition, and the remaining 10% is leakage of the $Tm^{3+}$ laser emission owing to the transmission at the concave surface of the output coupler at 2.1 $\mu m$. The slope efficiency of the $Ho^{3+}$:YAG laser crystal output is substantially about 42% of the absorbed 785 nm pump power.

With the above intracavity pumping technique, upconversion is eliminated and absorption losses are substantially decreased. Thus, the intracavity-pumped laser has a relatively high slope efficiency. The foregoing embodiments are intended to be illustrative and not limiting. Thus various modifications may be made without departing from the spirit and scope of the present invention as defined in the appended claims.

What is claimed and desired to be secured by letters patent of the United States is:

1. A laser comprising:
   a laser cavity defined by a reflective element and a partially reflective element opposing each other on a common axis to form a reflective path therebetween;
   a first laser crystal disposed in said laser cavity, said first laser crystal having a first host material doped with a first predetermined concentration of a first-type of ions;

a second laser crystal disposed in said laser cavity, said second laser crystal having a second host material doped with a second predetermined concentration of a second-type of ions; and a pump laser for resonantly end-pumping said first laser crystal with a pump beam to cause said first laser crystal to produce a first laser emission to pump said second laser crystal, said second laser crystal being responsive to the first laser emission for producing an output second laser emission.

2. The laser of claim 1 wherein:
each of said first and second host materials is selected from the group consisting of YAG, YSAG, YSGG, YGG, GGG, GSAG, GSGG, LLGG, YAP and YLF and mixtures thereof.

3. The laser of claim 2 wherein:
said first-type of ions is thulium, and said first predetermined concentration of thulium is within the range between about 2.5% and about 20%; and
said second-type of ions is holmium, and said second predetermined concentration of holmium is within the range between about 0.05% and about 2%.

4. The laser of claim 1 wherein:
each of said first and second host materials is selected from the group consisting of YAG, YSAG, YSGG, GSAG, GSGG and mixtures thereof;
said first-type of ions is thulium, and said first predetermined concentration of thulium is within the range between about 4% and about 12%; and
said second-type of ions is holmium, and said second predetermined concentration of holmium is within the range between about 0.01% and about 1%.

5. The laser of claim 1 wherein:
each of said first and second host materials is selected from the group consisting of YAG, YSAG, YSGG and mixtures thereof;
said first-type of ions is thulium, and said first predetermined concentration of thulium is within the range between about 6% and about 8%; and
said second-type of ions is holmium, and said second predetermined concentration of holmium is within the range between about 0.03% and about 0.5%.

6. The laser of claim 1 wherein:
each of said first and second host materials is YAG;
said first-type of ions is thulium, and said first predetermined concentration of thulium is substantially equal to about 12%; and
said second-type of ions is holmium, and said second predetermined concentration of holmium is substantially equal to about 0.5%.

7. The laser of claim 1 wherein:
said pump beam, first laser emission and second laser emission have wavelengths substantially equal to about 785 nm, 2.0 μm and 2.1 μm, respectively.

8. The laser of claim 1 wherein:
said first and second laser crystals are optically coupled to each other.

9. The laser of claim 1 wherein:
said reflective element is highly reflective to light having a wavelength between 2.0 μm to 2.1 μm and is highly transmissive to light having a wavelength of 785 nm.

10. The laser of claim 9 wherein:
said reflective element is formed on said first laser crystal.

11. The laser of claim 1 wherein:
said partially reflective element is an output coupler.

12. The laser of claim 1 wherein:
said partially reflective element is highly reflective to light having a wavelength of about 2.0 μm and has a predetermined reflectivity to light having a wavelength of about 2.1 μm.

13. The laser of claim 1 further comprising:
a third reflective element formed between said second laser crystal and said partially reflective element, said third reflective element being anti-reflective to light having a wavelength between about 2.0 μm and about 2.1 μm.

14. The laser of claim 1 wherein:
said pump laser is selected from the group consisting of a diode laser and a Ti:Sapphire laser.

15. A method of producing a laser emission at a preselected wavelength, said method comprising the steps of:
resonantly end-pumping a first laser crystal disposed in a laser cavity and doped with thulium ions with a pump laser to raise the thulium ions from a $^3H_6$ electronic state to a $^3F_4$ electronic state, the first laser crystal emitting a first laser emission as the thulium ions decay from the $^3F_4$ electronic state to the $^3H_6$ electronic state; and
pumping a second laser crystal disposed in the laser cavity and doped with holmium ions with the first laser emission to raise the holmium ions from a $^5I_8$ electronic state to a $^5I_7$ electronic state, the second laser crystal emitting a laser emission at the preselected wavelength as the holmium ions decay from the $^5I_7$ electronic state to the $^5I_8$ electronic state.

16. The method of claim 15 wherein said step of pumping the first laser crystal to raise the thulium ions from the $^3H_6$ electronic state tot he $^3F_4$ electronic state comprises the steps of:
resonantly end-pumping the thulium ions from the $^3H_6$ electronic state to a $^3H_4$ electronic state; and
raising other thulium ions from the $^3H_6$ electronic state tot he $^3F_4$ electronic state as the thulium ions at the $^3H_4$ electronic state undergo a transition from the $^3H_4$ electronic state to the $^3F_4$ electronic state.

17. The method of claim 16 wherein said step of raising other thulium ions from the $^3H_6$ electronic state to the $^3F_4$ electronic state is a self-quenching process.

* * * * *